US009389757B1

(12) United States Patent
Chen et al.

(10) Patent No.: US 9,389,757 B1
(45) Date of Patent: Jul. 12, 2016

(54) CONTENT PREVIEW FOR ELECTRONIC DEVICES

(71) Applicant: Amazon Technologies, Inc., Reno, NV (US)

(72) Inventors: Eric Chen, Seattle, WA (US); Nathalie Cheng, Seattle, WA (US); Joseph King, Seattle, WA (US); Praneeth Wanigasekera, Seattle, WA (US); Andrew Craft, Seattle, WA (US); Mani Natarajan, Seattle, WA (US); Michael Erik Carl Bjorkegren, Seattle, WA (US); Edward Sanchez, Seattle, WA (US); Shimone Samuel, Bellevue, WA (US); Shanmugarasa Muhunthan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 261 days.

(21) Appl. No.: 14/094,429

(22) Filed: Dec. 2, 2013

(51) Int. Cl.
  *G06F 3/048* (2013.01)
  *G06F 3/0483* (2013.01)

(52) U.S. Cl.
  CPC .................................. *G06F 3/0483* (2013.01)

(58) Field of Classification Search
  CPC ............ G06F 3/0481–3/04883; G06F 15/0291
  See application file for complete search history.

(56) References Cited

U.S. PATENT DOCUMENTS

| 6,243,071 | B1* | 6/2001 | Shwarts | G06F 3/0483 715/776 |
| 2004/0205501 | A1* | 10/2004 | Gupta | G06F 17/30873 715/205 |
| 2006/0277167 | A1 | 12/2006 | Gross et al. | |
| 2008/0155458 | A1 | 6/2008 | Fagans et al. | |
| 2010/0150520 | A1* | 6/2010 | Hopwood | H04N 5/783 386/278 |
| 2012/0192118 | A1 | 7/2012 | Migos et al. | |
| 2013/0198596 | A1* | 8/2013 | Angelillo | G06F 17/211 715/205 |
| 2015/0121212 | A1* | 4/2015 | Anderson | G06F 17/211 715/273 |

OTHER PUBLICATIONS

Office action for U.S. Appl. No. 14/094,339 mailed on Nov. 20, 2015, King et al., "Content Preview for Electronic Devices", 15 pages.

* cited by examiner

*Primary Examiner* — Claudia Dragoescu
(74) *Attorney, Agent, or Firm* — Lee & Hayes, PLLC

(57) ABSTRACT

Techniques for previewing portions of the content item using an electronic device include displaying a first portion of the content item, receiving input from a user indicative of a desire to browse a second portion of the content item different than the first portion, and displaying a preview window illustrating the second portion of the content item in response to the input. The preview window may enable the user to simultaneously view the second portion illustrated therein as well as at least part of the first portion. In addition, a viewing position of the user may be maintained at a location of the first portion in the content item while the second portion is illustrated in the preview window. Accordingly, the user may not lose context of the first portion of the content item while the viewing the second portion.

23 Claims, 6 Drawing Sheets

CONTENT PREVIEW FOR ELECTRONIC DEVICES

BACKGROUND

A large and growing population of users is consuming digital content items on a varying array of electronic devices. These electronic devices include dedicated electronic book reader devices, smartphones, desktop computers, laptop computers, personal digital assistants (PDAs), tablet computing devices, and the like. While consuming content items on these devices, users often change viewing positions in the content item in order to read ahead or to review a portion of the content item that the user has previously read. For instance, when reading an electronic book on an electronic book reader, a user may scroll or otherwise move from the page of the electronic book that the user is currently reading to a page that the user previously read in order to review content on the previously read page. However, because the user has changed his/her viewing position in the electronic book from the current page to the previously read page, the user may have difficulty returning to his/her original viewing position in order to continue reading. As a result, the user experience on such devices may not be optimized.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

In FIG. 4, the UI includes a preview window illustrating the second portion of the content item and a bookmark window including a plurality of bookmark controls.

In FIG. 5, the UI includes a preview window illustrating a portion of the content item recommended to the user by the electronic device based on previous activity by the user.

DETAILED DESCRIPTION

Figure 1:
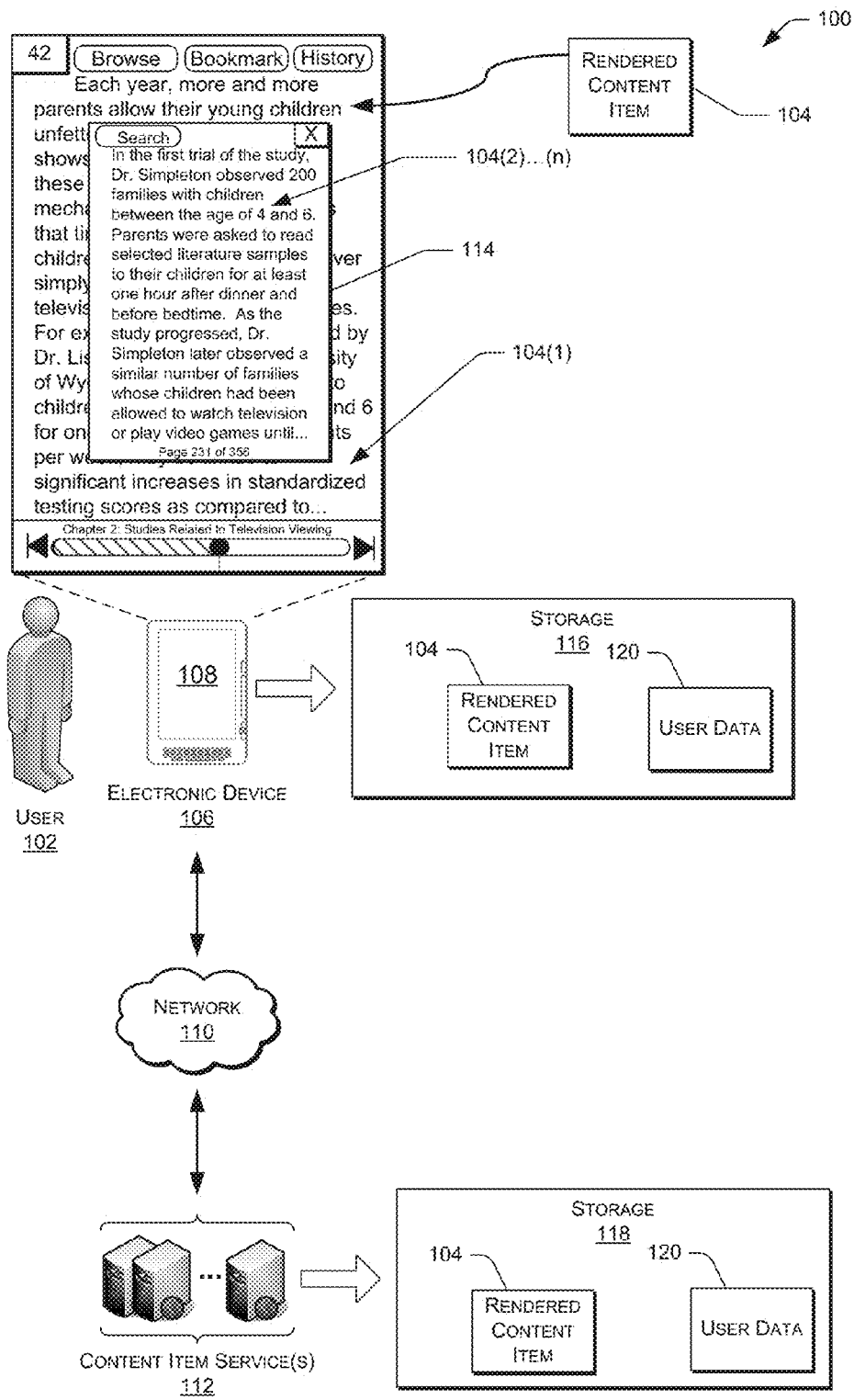
FIG. 1 illustrates an example architecture in which a user reads a content item on an electronic device.

This disclosure describes systems, devices, methods, and processes (collectively "techniques") for interactively previewing portions of a content item on an electronic device while a current viewing position of the user is maintained (e.g., held constant) at a current location in the content item. The viewing position may be maintained at a location of a first portion of the content item (e.g., the page, paragraph, sentence, figure, or other individual segment of the content item that is currently being consumed by the user) while one or more other portions of the content item are browsed (e.g., read, viewed, accessed, previewed, listened to, displayed, navigated to, etc.) by the user. As a result, the user may not lose track of his/her progress in consuming the content item. As will be described below, the content items, and the various portions thereof, may comprise any sort of content that is able to be output visually, audibly, tactilely, or in any other user-perceivable manner. For instance, portions of the content item may include sentences, paragraphs, or pages from books, graphs, illustrations, or other figures typically found in such books, clippings from websites, posts from a social networking, blogging, or micro-blogging services, audio clips, video clips, images, or the like.

For instance, when a user consumes (e.g., reads, listens to, etc.) a content item on an electronic device, the electronic device and/or the user may access a content item stored either locally on the electronic device or at a remote content item service. The electronic device may be controlled to display a first portion of the content item such as, for example, on a display associated with the electronic device. For example, one or more processors of the electronic device may be configured to access the stored content item and to direct the first portion of the content item to the display for consumption by the user.

As the user consumes the content item on the electronic device, the user may direct one or more inputs to the electronic device indicative of a desire to browse additional portions of the content item on the electronic device. The electronic device may, for example, include various components configured to receive a first input from the user indicative of a desire to browse a second portion of the content item on the electronic device different than the first portion currently being displayed. In response to receiving such a first input, the electronic device may display a preview window on the display illustrating the second portion of the content item.

In example embodiments of the present disclosure, the preview windows described herein may be useful in a number of different but related applications. For example, the preview window may enable the user to browse portions of the content item that are either ahead of or behind the user's current viewing position. Additionally, the preview window may enable the user to browse one or more portions of the content item previously bookmarked by the user. Such bookmarked portions of the content item may be, for example, portions of particular interest to the user, portions of particular relevance to the overall theme or plot of the content item, and the like. In any of the embodiments described herein, such portions of the content item may comprise portions that the user has identified as having a level of importance that is greater than a level of importance associated with the portion of the content item currently being displayed on the device and/or being otherwise consumed by the user. As a result, the user may bookmark such portions of the content item to identify their heightened level importance, and to simplify referring back to such portions at a later time. Moreover, the preview window may enable the user to browse one or more portions of the content item recommended to the user by the electronic device. In an embodiment, such portions may be recommended by the electronic device based on previous activity by the user. For example, the electronic device may recommend such portions of the content item to the user based on a general browsing history of the user, activity by the user associated with browsing the content item currently being consumed on the electronic device, and/or other like metrics.

In each of these applications, the preview window may enable the user to browse the second portion of the content item described above, as well as a plurality of additional portions of the content item, without requiring the user to change his/her viewing position. For example, while the user is consuming the first portion of the content item on the electronic device, the viewing position of the user may be at the particular location (e.g., the page, paragraph, sentence, figure, or other individual segment of the content item) of the first portion in the content item. The viewing position of the user may be maintained at the location of the first portion in the content item while the preview window is displayed and while the user browses various additional portions of the content item via the preview window. In this way, the user may browse such additional portions of the content item without losing track of his/her progress in consuming the content item.

As will be described below, the preview window may be displayed so as to partially overlay the first portion of the content item that is currently being displayed on the electronic device. In such an embodiment, the first portion of the content item may remain visible to the user outside of a boundary of the preview window. Thus the displayed first portion may be visible by the user simultaneously with the second portion of the content item illustrated in the preview window. For example, the first portion may be at least partially visible on the electronic device, outside of the preview window, when the preview window is displayed. In this way, the first portion and the second portion may be displayed on a display of the electronic device such that a part of the first portion is displayed on the display outside of the window, and a remainder of the first portion is obscured by the window. In such an example, it is understood the "obscured" remainder may include the area, content, and/or part of the first portion that would be displayed but for the presence and/or display of the window. In this example, it may appear to the user viewing the display that the window is disposed on top of or covering the remainder of the first portion such that the remainder is obscured and/or otherwise not visible.

Further, while the user is consuming the content item on the electronic device, the user may direct second, third, and/or additional inputs to the electronic device. For example, the user may direct a second input to the electronic device indicative of a desire by the user to view one of the first portion currently being displayed on the electronic device or the second portion currently being illustrated in the preview window. Such a second input may be, for example, the result of the user browsing the second portion, or a plurality of additional portions, via the preview window and deciding to either return to the first portion as currently displayed on the electronic device or to jump to a location of the second portion in the content item such that the second portion is displayed on the electronic device in place of the first portion. It is understood that displaying the second portion on the electronic device in place of the first portion in this way may result in moving the viewing position of the user. For example, displaying the second portion on the electronic device may move the viewing position of the user from the location of the first portion in the content item to a location of the second portion in the content item. In one embodiment, the electronic device may receive a second input from the user indicative of a desire to view the second portion and, in response to such a second input, the electronic device may display the second portion of the content item on the display of the electronic device with the preview window closed and/or otherwise deactivated. In such an embodiment, displaying the second portion may move the viewing position of the user from the location of the first portion in the content item to the location of the second portion in the content item.

Further, in embodiments in which the preview window is configured to assist the user in browsing various portions of the content item, a first input received from the user may include a selection by the user of a browse control displayed and/or otherwise provided by the electronic device. For example, the electronic device may provide the browse control via the display thereof, and selection of the browse control by the user may result in the display of a navigation control. The navigation control may resemble a scrubber bar or other like digital controls enabling the user to move his/her viewing position to various different locations in the content item. In one embodiment, the navigation control may enable the user to change his/her browsing position. Such a browsing position may be analogous to the viewing position described above, but may be applicable to and/or otherwise correspond to a location of the second portion (or other various portion of the content item currently illustrated in the preview window) in the content item. Accordingly, selection of the browse control by the user may result in display of such a navigation control operable to enable the user to browse the content item via the preview window while the viewing position of the user is maintained. In some embodiments, the navigation control may be displayed on the electronic device in response to receiving a first input from the user (e.g., a first input comprising selection of the browse control), and the preview window may be displayed either concurrently with displaying the navigation control or in response to receiving an additional input from the user indicative of a desire to manipulate and/or otherwise adjust the navigation control.

In embodiments of the present disclosure, the preview window may be operable to receive one or more inputs from the user and, thus, may comprise an interactive tool or application for browsing the content item. For example, the preview window may be operable to receive an input from the user indicative of a desire to browse an additional portion of the content item in the preview window. In such an embodiment, the electronic device may illustrate the desired additional portion of the content item in the preview window in response to such an input. Additionally, the electronic device may move a browsing position of the user from a location of the second portion in the content item to a location of the additional desired portion in the content item.

Alternatively, and/or in addition, once the navigation control is displayed, the user may provide an additional input that is received at the navigation control, and that is indicative of a desire by the user to view an additional portion of the content item by adjusting the navigation control. In such an embodiment, the electronic device may illustrate the desired additional portion of the content item in the preview window in response to the additional input while maintaining the viewing position of the user constant.

Moreover, the electronic device may provide a search control associated with the various browsing functionality described herein. For example, the electronic device may provide a search control associated with the preview window and/or the navigation control. In an exemplary embodiment, such a search control may resemble a typical search dialog box as known in the art, and the search control may enable the user to browse various portions of the content item based on entered search criteria. For example, the search control may enable the user to browse portions of the content item sharing a common context characteristic via the preview window. Such a context characteristic may include, for example, one or more categories, genres, graphic types, text types, and/or other context-based characteristics of content included in the content item.

In further exemplary embodiments in which the preview window is configured to assist the user in browsing portions of the content item that were previously bookmarked by the user, the electronic device may be configured to display a bookmark window illustrating one or more bookmark controls. Such bookmark controls may be associated with respective portions of the content item that have been bookmarked by the user during previous consumption of the content item. For example, the bookmark window may include a bookmark control associated with the portion of the content item currently illustrated in the preview window, whether or not the currently illustrated portion has been previously bookmarked by the user. The bookmark window may also include an additional bookmark control associated with an additional portion of the content item that has been previously bookmarked by the user. Such bookmark controls may enable the user to add, for example, the portion of the content item currently illustrated in the preview window to the users existing list of bookmarks. Such bookmark controls may also enable the user to view portions of the content item that have already been bookmarked. Accordingly, in the embodiments described herein, the bookmark window may comprise an interactive tool for browsing portions of the content item previously indicated by the user as being of some importance. For example, the bookmark window may be operable to receive an input from the user indicative of a desire to browse a bookmarked portion of the content item via the preview window. For instance, the user may select the desired bookmarked portion at the bookmark window from among a list of previously bookmarked portions of the content item. In such an embodiment, the electronic device may illustrate the selected bookmarked portion in the preview window in response to such input.

In still further exemplary embodiments, the preview window may be configured to assist the user in browsing portions of the content item that have been recommended to the user by components of the electronic device. Such recommendations may be based on previous activity by the user associated with the content item generally and/or based on previous activity by the user associated with browsing the content item on the electronic device. In such embodiments, the preview window may be configured to illustrate the recommended portion.

As will be described in greater detail below, portions of the content item may be recommended to the user in situations in which the user has a browse history characterized by "non-linearly" jumping and/or otherwise browsing between various spaced portions of the content item. Such nonlinear browsing may include, for example, browsing a target portion of the content item from an initial portion of the content item, wherein the initial portion of the content item is spaced from the target portion by more than one individual segment of the content item. In such an embodiment, the electronic device may recommend the target location to the user by providing an indication to the user indicative of the location of the target portion. The user may access and/or otherwise browse the recommended portion via the preview window.

In still further embodiments, upon browsing the target portion from the initial portion, the user may have also browsed a plurality of additional portions of the content item. In such an embodiment, each portion of the plurality of additional portions browsed by the user may be spaced from the initial portion by more than one individual segment of the content item. Accordingly, in such a situation, the electronic device may save, in the memory thereof, for example a respective location in the content item of each portion of the plurality of additional portions, and may provide an indication to the user indicative of at least one of the respective saved locations.

The claimed techniques are described below with reference to an example architecture. However, it is to be appreciated that a number of other architectures may also employ these techniques.

FIG. 1 illustrates an example architecture 100 in which a user 102 reads and/or otherwise consumes a content item 104. The content item 104 may include various portions 104(1), 104(2) . . . (n) that can be displayed or illustrated on an electronic device 106. As described in detail below, in this example the user 102 may provide one or more inputs to the electronic device 106, and the electronic device 106 may perform various operations in response to receiving such inputs.

In this example, the electronic device 106 has a display 108 upon which electronic content such as content items or electronic books may be rendered. The terms content, content item, and electronic book include essentially any form of electronic data that may be consumed on a device, including textual and verbal works comprising sequences of words such as digital books, audio books, electronic magazines, papers, journals, periodicals, documents, instructional materials, course content, website content, music, movies, and so on. In other examples, the user 102 may employ electronic devices that do not include a display, but rather include speakers or another output device for outputting audio or the like. Additionally, the various portions 104(1), 104(2) . . . (n) of the content item 104 may comprise a chapter, page, paragraph, sentence, figure, or other individual segment of the content item 104.

The electronic device 106 may comprise a desktop computer, a laptop computer, or any other type of electronic device. In some instances, the electronic device 106 may be a handheld or other small, light-weight, portable device upon which electronic books and other content can be rendered and conveniently viewed in a manner similar to viewing a paper book. Examples of electronic book readers include flat form-factor devices such as tablets, pads, smartphones, personal digital assistants (PDAs), and the like, as well as other types of electronic devices configured to render electronic books (e.g., personal computers, laptop computers, etc.).

In some embodiments, the electronic device 106 may comprise a dedicated-purpose electronic book reader device, having a flat-panel display and other characteristics that mimic the look, feel, and experience offered by paper-based books. For example, such an electronic book reader devices may have a high-contrast flat-panel display that appears similar to a printed page and that persist without frequent refreshing. Such displays may consume very negligible amounts of power, so that the electronic book reader devices may be used for long periods without recharging or replacing batteries. In some instances, these readers may employ electrophoretic displays.

In the example of FIG. 1, the electronic device 106 has networking capabilities. For example, the electronic device 106 may have a wireless communication interface that allows communication though a network 110. The wireless communications interfaces may utilize WiFi, cellular, or other wireless data and networking technologies. The network 110 may be any type of communication network, including a local-area network, a wide-area network, the Internet, a wireless network, a wide-area network (WWAN), a cable television network, a telephone network, a cellular communications network, combinations of the foregoing, etc.

In the described embodiment, the electronic device 106 includes non-volatile storage capabilities so that electronic content items can be downloaded and stored in their entirety on the device. In some instances, once an electronic book has been stored by an electronic reader, it can be displayed and read at any time, whether or not the electronic reader is connected to a network. In other embodiments, meanwhile, the device may stream or otherwise receive content items on-demand.

In the configuration illustrated by FIG. 1, the electronic device 106 may obtain content items from a content item service 112 and/or from any other service. The service 112 and other services may be accessed using the networking capabilities of the electronic device 106. The service 112 and the other services may be accessible through other means as well, such as by connection to intermediary devices like personal computers, different types of mobile devices, and so forth.

In FIG. 1, the content item service 112 is illustrated as a network-based or cloud-based service, available over a public network such as the Internet. The electronic device 106 may be configured to allow the user 102 to conveniently browse for content and content items from the service 112, and to purchase and download selected content items from the service 112.

Various applications and user interfaces may be used in conjunction with the electronic device 106 to interact with the service 112, such as Internet browser programs that allow a user to interactively engage different online services. In addition, the service 112 may expose lower-level interfaces or APIs (application programming interfaces) through the network 110, through which devices and programs can access the underlying functionality of the service 112 without direct user interaction.

The service 112 might be implemented in some embodiments by an online merchant or vendor. Electronic books and other electronic content might be offered for sale by such an online merchant, or might be available to members or subscribers for some type of periodic or one-time fee. In some circumstances, electronic books or other content might be made available without charge. In either instance, the service 112 may include a client interface through which the electronic device 106 and other devices interact with the service 112. The client interface may include a virtual storefront or other type of online interface for interaction with consumers and/or devices. The client interface may expose a graphical, web-based user interface that can be accessed by human users to browse and obtain (e.g., purchase, rent, lease, etc.) content items such as electronic books. The client interface may also expose programmatic interfaces or APIs that entities and devices can use to obtain digital content items and related services. In the illustrated example, the user 102 may have utilized the web-based user interface or the APIs to obtain the content item 104 being rendered by the display 108.

As shown in FIG. 1. In an example embodiment the electronic device 106 may be operable to display a first portion 104(1) of the content item 104 via the display 108. Additionally, electronic device 106 may be operable to display a preview window 114 via the display 108. In one example, second, third, and/or additional portions 104(2) . . . (n) of the content item 104 may be illustrated in the preview window 114. The preview window 114 may be positioned at any desirable location on the display 108, and may be movable for convenience of the user. In one example, the preview window 114 may be disposed so as to partially overlay the first portion 104(1) displayed on the display 108. In such an embodiment, the first portion 104(1) may remain visible outside of the preview window 114 simultaneously with the second, third, and/or additional portions 104(2) . . . (n) illustrated in the preview window 114. For example, the preview window 114 may overlay the first portion 104(1) such that the first portion 104(1) is at least partially visible outside of the preview window 114 as the second, third, and/or additional portion 104(2) . . . (n) is illustrated in the preview window 114. In an example embodiment, the first portion 104(1) and the second, third, and/or additional portion 104(2) . . . (n) may be displayed on the display 108 of the electronic device 106 such that a part of the first portion 104(1) is displayed on the display 108 outside of the window 114, and a remainder of the first portion 104(1) is obscured by the window 114. In such an example, it is understood the "obscured" remainder may include the area, content, and/or part of the first portion 104(1) that would be displayed on the display 108 but for the presence and/or display of the window 114 thereon. In this example, it may appear to the user 102 viewing the display 108 that the window 114 is disposed on top of or covering the remainder of the first portion 104(1) such that the remainder is obscured and/or otherwise not visible.

In some instances, the electronic device 106 may include non-volatile storage 116 that stores the currently-rendered content item 104, while in other instances the content item 104 may be stored remotely from the electronic device. For instance, the content item service 112 may store, in non-volatile storage 118, these items in association with an account of the electronic device 106 and/or the user 102. Furthermore, in some instances, the electronic device 106 may locally store a portion of the content items previously acquired by the user, while the service 112 (or another remote entity) may store, in an account of the user 102 or the device 106, other content items that the user 102 has previously acquired. The non-volatile storage 116, 118 may store multiple different content items for consumption by various users 102, and in example embodiments, the device 106 may simultaneously display more than one content item 104 to the user 102. For example, the device 106 may be controlled such that the first portion 104(1) displayed on the display 108 is from a first content item 104 (e.g., a first book), and the second portion 104(2) illustrated in the preview window is from a second content item 104 (e.g., a second book) different than the first content item 104.

Furthermore, FIG. 1 illustrates that the electronic device or the content item service 112 may store user data 120 accessible to the electronic device 106. The user data 120 may include a browse history, a user profile, and/or any other type of data associated with the user 102 and/or various activities of the user 102 associated with use of the electronic device 106. As with the other items discussed above, the electronic device 106 may store the user data 120 locally, or the electronic device 106 may access the user data 120 at the service 112 or another remote entity (e.g., over the network 110).

Figure 2:
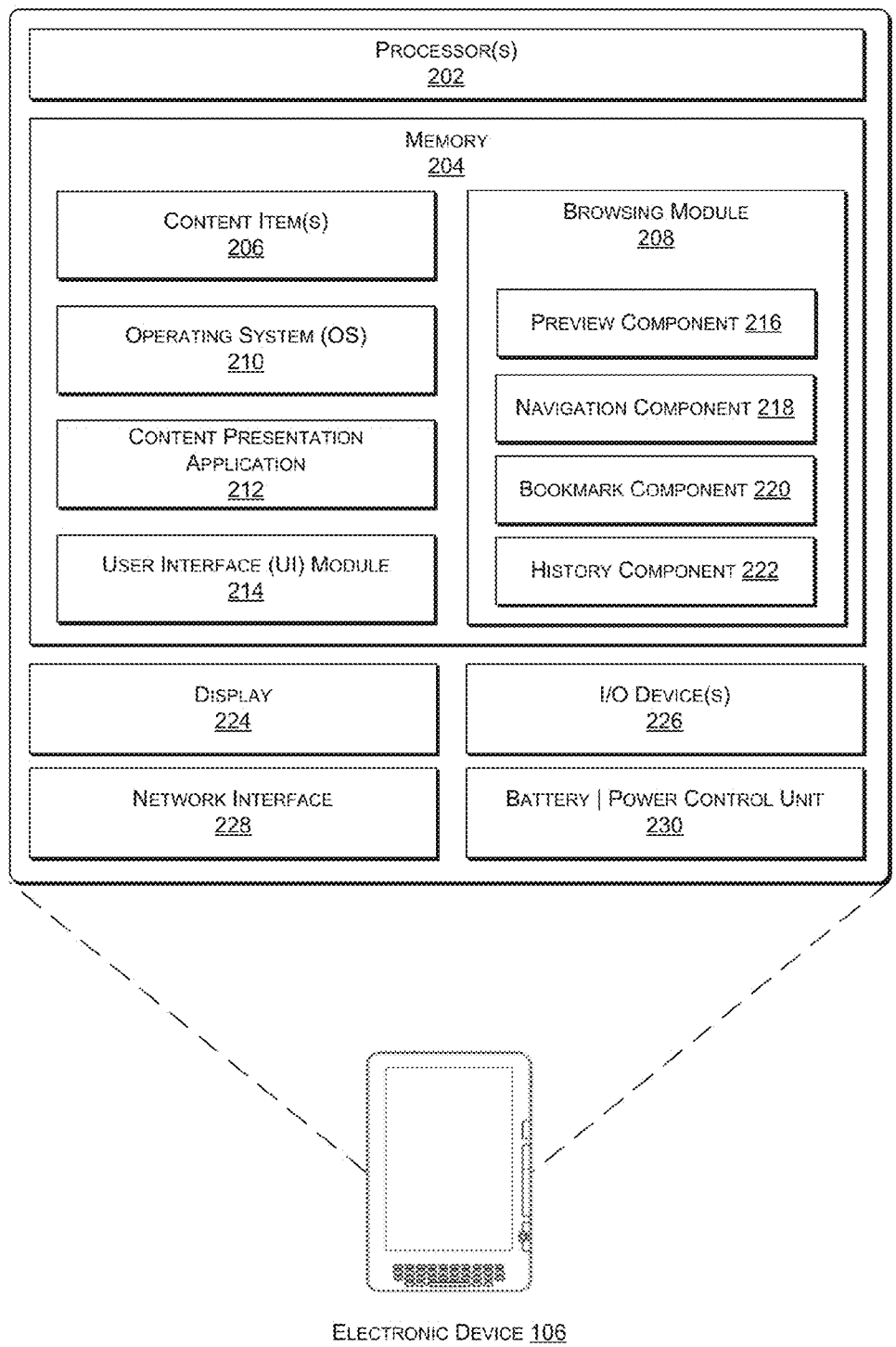
FIG. 2 illustrates components of the example electronic device of FIG. 1.

FIG. 2 is a block diagram showing an example of the electronic device 106, indicating components that are relevant to this discussion. In this embodiment, the electronic device 106 is a dedicated electronic book reader device, designed specifically for the purpose of emulating a traditional book-like reading experience. To that end, it is has a size and weight that is comparable to a paper-based book, and uses a monochrome display having a contrast ratio that approaches that of the printed page. Of course, as discussed above, the electronic device 106 may comprise any other type of device in other instances. Additionally, although the electronic device 106 illustrated in FIG. 2 is shown as including an example keyboard and various other user interface controls, in other electronic device embodiments, one or more of such controls may be omitted or combined.

In one configuration, the electronic device 106 includes one or more processors 202 and memory 204. Depending on the configuration of the electronic device 106, the memory 204 may be a type of computer storage media and may include volatile and nonvolatile memory. Thus, the memory 204 may include, but is not limited to, RAM, ROM, EEPROM, flash memory, or other memory technology, or any other medium which can be used to store media items or applications and data which can be accessed by the electronic device 106.

The memory 204 may be used to store any number of functional components that are executable on the processors 202. In many embodiments, these functional components comprise instructions or programs that are executable by the processors 202 and that implement operational logic for performing the actions attributed above to the electronic device 106. In addition, the memory 204 may store various types of data that are referenced by executable programs. Furthermore, it is noted that while the components described below are illustrated as residing on the device 106, in some embodiments some or all of these components may reside remote from the device 106. For instance, some or all of these components may reside on the content item service 112 and/or another server that may perform some or all of the operations described herein.

As discussed above, the memory 204 may store one or more content items 206 (e.g., the content item 104 illustrated in FIG. 1), as well as various data (e.g., the user data 120 illustrated in FIG. 1). Further, the memory 204 may store a browsing module 208 including a plurality of components or sub-modules. The browsing module 208 may be executable on the one or more processors 202 of the electronic device, and the browsing module 208 may be configured to perform operations in response to one or more components of the electronic device 106 receiving one or more inputs from the user. As will be described in greater detail below, the browsing module 208 and its components may function to control operation of the preview window 114, and the various browsing, navigation, searching, bookmarking, history recommendation, and/or other operations associated with the preview window 114. The memory 204 may also store an operating system 210, a content presentation application 212, and a user interface (UI) module 214. The content presentation application 212 may function to output content on the device. For instance, the application 212 may display visual content on a display, audible content on a speaker, and the like.

The UI module 214, meanwhile, facilitates user operation of the electronic device 106. For instance, the UI module 214 may provide menus and other navigational tools to facilitate selection and rendering of content items. The UI module 214 may further include a browser or other application that facilitates access to sites over a network, such as websites or online merchants, or other sources of electronic content items or other products.

As illustrated in FIG. 2, the example browsing module 208 includes a preview component 216, a navigation component 218, a bookmark component 220, and a history component 222. In the various embodiments described herein, one or more of the components of the browsing module 208 may cooperate to provide functionality to the electronic device 106. In particular, such components of the browsing module 208 may cooperate to control various operations of the preview window 114 in response to the electronic device 106 receiving one or more inputs from the user. The browsing module 208 may include additional or fewer components than those described in FIG. 2, and in some embodiments, the various processes, functions and/or operations described with respect to the device 106 may be performed by any of the components of the browsing module 208 in conjunction with the one or more processors 202.

In one embodiment, the preview component 216 of the browsing module 208 may be configured to generate the preview window 114 for viewing by the user 102 on the electronic device 106. In an exemplary embodiment, the navigation component 218 may assist the preview component 216 in generating the preview window 114. For example, the navigation component 218 may be configured to generate a navigation control on the electronic device 106, such as on the display 108 shown in FIG. 1, in response to a first input received from the user 102. In such embodiments, the preview component 216 may be configured to generate the preview window 114 either concurrently with generation of the navigation control or in response to receiving an additional input from the user 102 indicative of a desire to adjust the navigation control generated by the navigation component 218. Accordingly, in such embodiments, the navigation control may be displayed on the electronic device 106 in response to the first input. Likewise, the preview window 114 may be displayed either concurrently with displaying the navigation control or in response to receiving the additional input from the user 102. Further, in such embodiments the preview component 216 may provide the preview window 114 to the display 108 for display thereon, and the navigation component 218 may provide navigation control to the display 108 for display thereon.

The preview component 216 may also be configured to populate and/or otherwise direct various portions of the content item 104 to the preview window 114 for illustration therein. For example, the preview component 216 may facilitate illustration of the second, third, and/or additional portions 104(2) . . . (n) of the content item 104 in the preview window 114 in response to corresponding inputs received from the user 102. In each of the embodiments described herein, the preview component 216 may enable the user 102 to browse various portions of the content item 104 while maintaining a viewing position of the user at a location of the first portion 104(1) in the content item 104. The preview component 216 may also enable the user 102 to browse various portions of different content items 104 while maintaining the user's viewing position at the location of the first portion 104(1) in the content item 104.

The navigation component 218 may assist the preview component 216 in facilitating browsing of the various portions of the content item 104. Further, in embodiments in which the electronic device 106 is controlled to simultaneously display two or more different content items 104 (e.g., a first book and a second book different than the first book), the navigation component 218 may assist the preview component 216 in facilitating browsing the various portions of the different content items 104. For example, as will be described in greater detail below, the navigation control generated by the navigation component 218 may include one or more controls configured to assist the user 102 in browsing the second, third, and/or additional portions 104(2) . . . (n) via the preview window 114. In such embodiments, the navigation component 218 may provide functionality to such controls. Additionally, the preview window 114 may be configured to receive one or more inputs directly from the user 102. In such embodiments, such inputs may assist the user in browsing the second, third, and/or additional portions 104(2) . . . (n) via the preview window 114, and the navigation component 218 may cooperate with the preview component 216 to provide such functionality. Further, as will be described below, the preview window may include one or more search controls enabling the user 102 to browse various portions of the content item 104 sharing a common context characteristic via the preview window 114. In such embodiments, one or both of the preview component 216 and the navigation component 218 may provide such searching functionality to the search controls. Such a context characteristic may include, for example, one or more categories, genres, graphic types, text types, and/or other context-based characteristics of content included in the content item 104.

The bookmark component 220 may be configured to provide a portion of the content item 104 that was previously identified, tagged, and/or otherwise bookmarked by the user 102 for viewing in the preview window 114. For example, the bookmark component 220 may be configured to generate a bookmark window on the electronic device 106. In such embodiments, the bookmark component 220 may generate the bookmark window in response to receipt of an input from the user indicative of a desire to view the previously bookmarked portion of the content item 104. In such embodiments, the bookmark window may include a bookmark control associated with a second portion 104(2) of the content item 104 currently illustrated in the preview window 114, as well as one or more additional bookmark controls associated with the respective previously bookmarked portions of the content item 104. In such embodiments, the bookmark component 220 may provide functionality to the bookmark window, the various bookmark controls illustrated therein, and the one or more controls associated with the bookmark controls. Further, it is understood that the bookmark component 220 may provide the bookmark window and the various bookmark controls to the display 108 of the electronic device 106 for display thereon. It is understood that such bookmarked portions of the content item 104 may comprise portions 104(2) ... 104(n) that the user 102 has identified as having a level of importance that is greater than a level of importance associated with the first portion 104(1) of the content item 104 currently being displayed on the display 108 and/or being otherwise consumed by the user 102. For example, the user 102 may consider the first portion 104(1) to have a first or relatively moderate level of importance to the overall theme, plot, or context of the content item 104. The user 102 may, however, consider the second portion 104(2) to have a second or relatively high level of importance to the overall theme, plot, or context of the content item 104. As a result, the user 102 may bookmark the second portion 104(2) of the content item 104 to identify its heightened level importance, and to simplify referring back to the second portion 104(2), and/or additional bookmarked portions, at a later time.

The history component 222 may be configured to recommend a portion of the content item 104 to the user 102 for viewing in the preview window 114 based on previous activity by the user 102 associated with the content item 104. The history component 222 may also recommend such portions of the content item 104 to the user 102 in response to input received from the user 102 indicative of a desire by the user 102 to browse various additional portions of the content item 104. In one embodiment, the history component 222 may recommend a portion of the content item 104 to the user 102 by identifying the recommended portion to the user 102 via the preview window 114 and/or the display 108.

The history component 222 may recommend such portions of the content item 104 to the user 124 based on a number of different factors. For example, the history component 222 may recommend such portions of the content item 104 to the user 102 based on a general browsing history of the user 102, activity by the user 102 associated with browsing, viewing, and/or otherwise navigating the content item 104 currently being consumed on the electronic device 106, and/or other like metrics. In one embodiment, such portions of the content item 104 may be recommended to the user 102 in situations in which the user 102 has a browse history characterized by nonlinearly jumping and/or otherwise browsing and/or otherwise navigating between various portions of the content item 104. Such nonlinear browsing may include, for example, browsing and/or otherwise navigating to a target portion of the content item 104 from an initial portion of the content item (e.g., a starting location), wherein the initial portion of the content item 104 is spaced from the target portion by more than one individual segment of the content item 104.

For example, if the user 102 is consuming an electronic book on the device 106 including a map located in an Appendix at the end of the book, the user 102 may periodically jump, browse, and/or otherwise navigate to the Appendix in order to view the map (i.e., such that the map and/or other portions of the Appendix are displayed in the preview window 114), and may then return to the initial portion of the content item 104 currently being consumed. Since the Appendix may be spaced from the initial portion of the content item 104 by many pages, such browsing may constitute "nonlinear" browsing and/or navigation. In such an embodiment, the electronic device 106 may save, in the memory 204 thereof, for example, a location in the content item 104 of the target portion previously navigated to by the user 102, and may recommend the target location to the user 102 by providing an indication to the user 102 indicative of the location of the target portion previously navigated to. Such an indication may comprise a list of such locations, one or more controls identifying such locations, a grouping of thumbnails or other like icons, and the like. As noted above, the user 102 may access and/or otherwise browse the recommended portion of the content item 104 via the preview window 114, and the history component 222 may cooperate with the preview component 216 to provide such functionality. In particular, the history component 222 may cooperate with the preview component 216 and/or the navigation component 218 to display, in the preview window 114, one or more portions of the content item 104 previously navigated to by the user 102 from one or more corresponding respective initial portions of the content item 104.

In still further embodiments, upon browsing and/or navigating to the target portion from the initial portion, the user 102 may have also browsed and/or navigated to a plurality of additional portions 104(2) ... 104(n) of the content item 104. In such an embodiment, each portion of the plurality of additional portions 104(2) ... 104(n) browsed and/or navigated to by the user 102 may be spaced from the initial portion by more than one individual segment of the content item 104. Accordingly, in such a situation, the history component 222 may save, in the memory 204 of the electronic device 106, for example, a respective location in the content item 104 of each portion of the plurality of additional portions 104(2) ... 104(n), and may provide an indication to the user 102 indicative of at least one of the respective saved locations.

While the above description provides various examples of the operations that may be performed by the components of the browsing module 208, it is understood that additional operations may be performed by these components, as described throughout the present disclosure.

As illustrated, the electronic device 106 may further include a display 224 upon which the content items 104 may be displayed and the preview window 114 may be illustrated. In one implementation, the display 224 uses electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some example electronic paper displays that may be used with the implementations described herein include bi-stable LCDs, MEMS, cholesteric, pigmented electrophoretic, electrowetting displays, and others. One exemplary electronic paper display that may be used is an E Ink-brand display. Touch sensitive technology may be overlaid or integrated with the electronic paper display technology to enable user input via contact or proximity to the screen.

The electronic device 106 may further be equipped with various input/output (I/O) devices 226. Such devices may include various user interface controls (e.g., buttons, joystick, keyboard, etc.), audio speaker, connection ports, and so forth. In some instances, a user of the electronic device 106 utilizes one or more of the input devices to select portions of content items rendered on the display 224 and/or to provide one or more inputs. The UI module 214 may receive indications of these selections and/or may receive such inputs, and may in turn pass these indications and/or inputs to the one or more processors 202, the browsing module 208, other components of the memory 204, and/or other components of the device 106.

Furthermore, the device 106 may include a network interface 228, which may support both wired and wireless connection to various networks, such as cellular networks, radio, WiFi networks, short range networks (e.g., Bluetooth), IR, and so forth. The network interface 228 facilitates receiving electronic books and other content as described herein.

The electronic device 106 may also include a battery and power control unit 230. The power control unit operatively controls an amount of power, or electrical energy, consumed by the electronic device 106. Actively controlling the amount of power consumed by the electronic device may achieve more efficient use of electrical energy stored by the battery.

The electronic device 106 may have additional features or functionality. For example, the electronic device 106 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Figure 3:
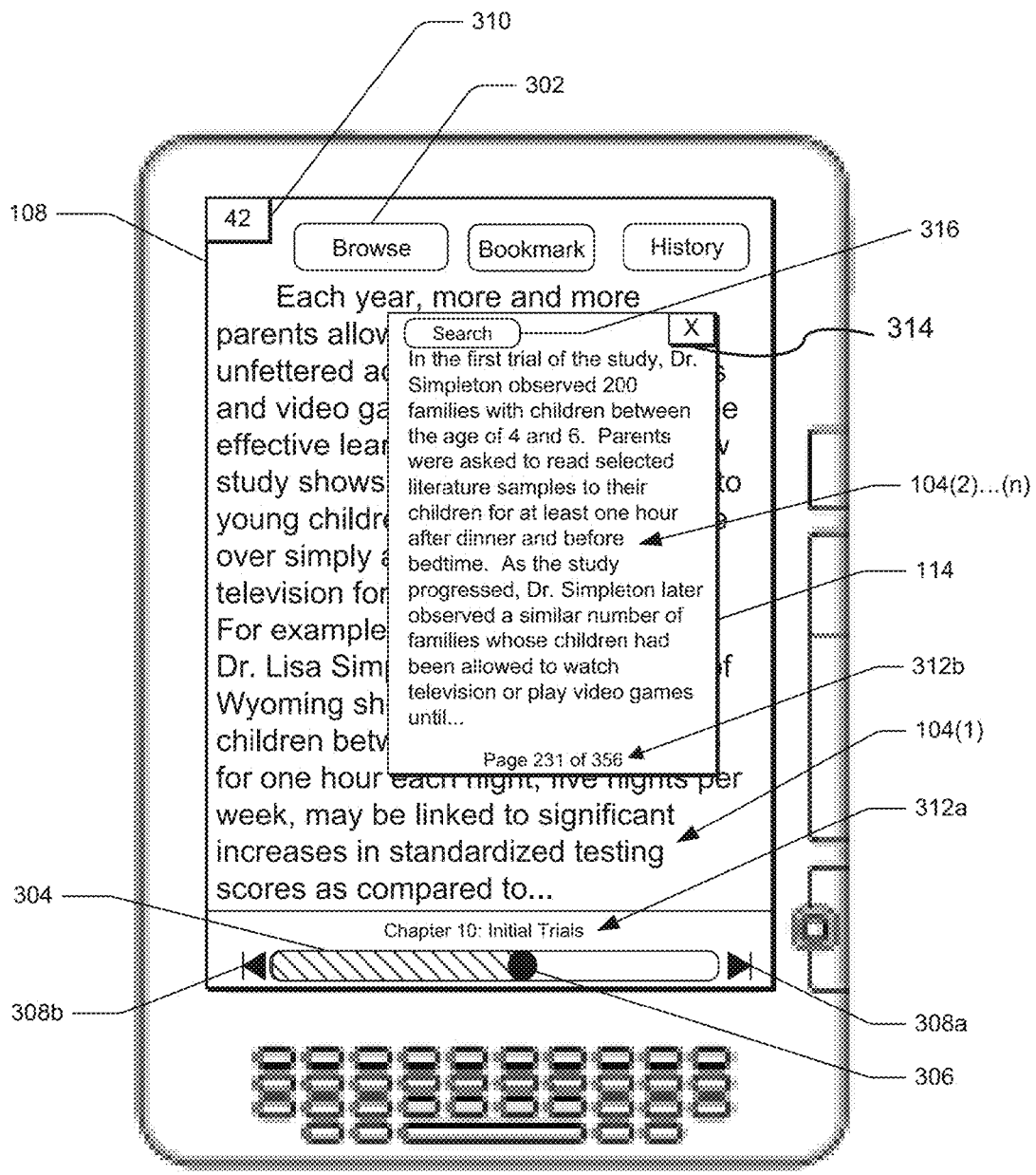
FIG. 3 illustrates an example user interface (UI) on the electronic device of FIG. 1. This UI displays a first portion of a content item that a user is currently consuming, and a preview window illustrating a second portion of the content item that the user is "browsing" via the preview window.
Figure 4:
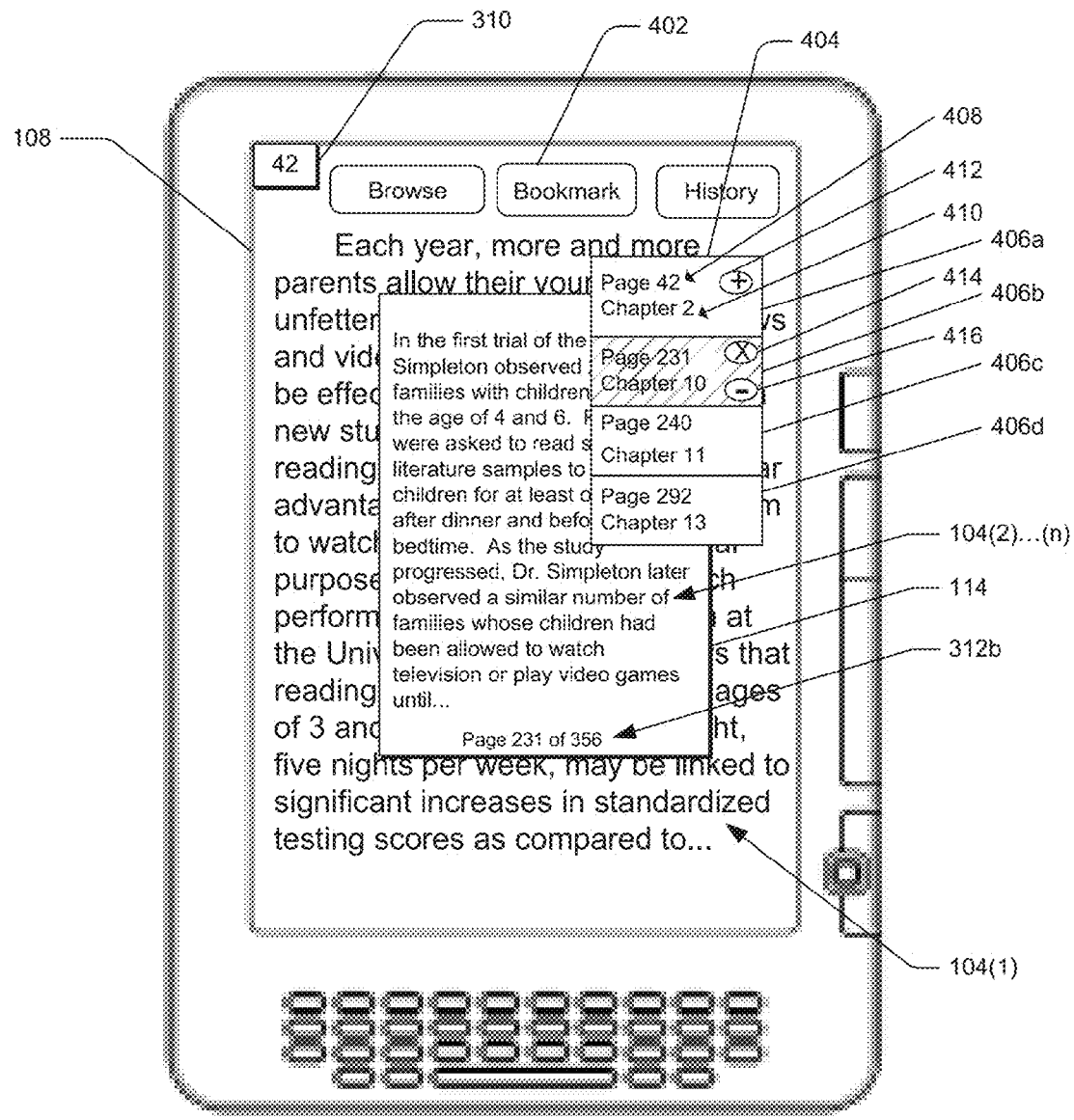
FIG. 4 illustrates another example UI on the electronic device of FIG. 1.
Figure 5:
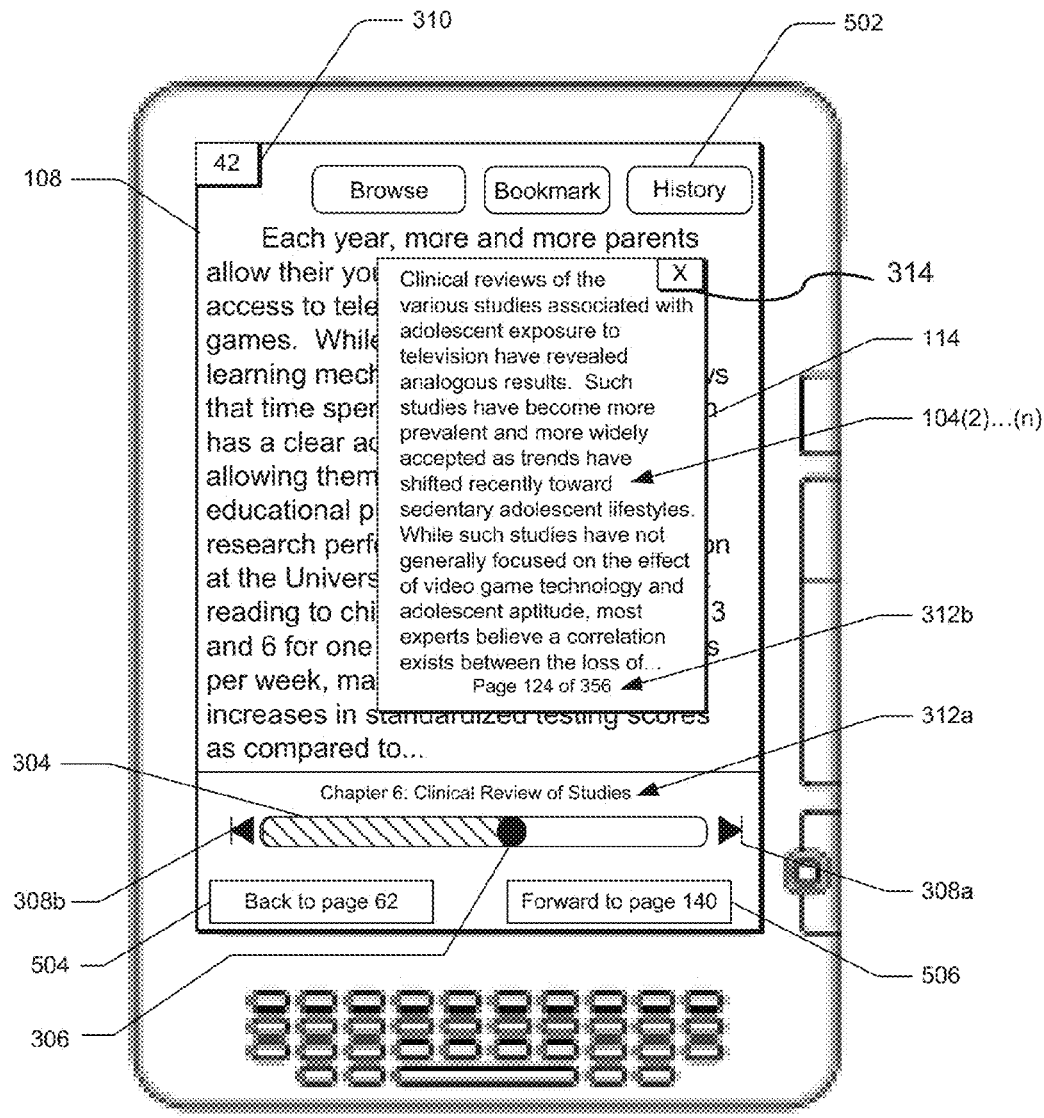
FIG. 5 illustrates still another example UI on the electronic device of FIG. 1.

FIGS. 3-5 illustrate example user interfaces (UIs) rendered and/or displayed on the electronic device 106 from FIG. 1. For example, the UI shown in FIG. 3 includes a preview window 114 configured to enable the user 102 to browse a plurality of portions 104(2) . . . 104(n) of the content item 104 that are either ahead of or behind a current viewing position of the user. Additionally, the UI shown in FIG. 4 includes a preview window 114 configured to enable the user 102 to browse one or more portions 104(2) . . . 104(n) of the content item 104 that were previously explicitly bookmarked by the user 102. Such bookmarked portions of the content item 104 may be, for example, portions of particular interest to the user 102, portions of particular relevance to the overall theme or plot of the content item 104, and the like. Moreover, the UI shown in FIG. 5 includes a preview window 114 configured to enable the user 102 to browse one or more portions 104(2) . . . 104(n) of the content item 104 recommended to the user 102 by the electronic device 106 based on an implicit, predicted, or assumed importance to the user 102. Throughout FIGS. 3-5, like reference number have been used to identify like components of the illustrated UIs.

With reference to FIG. 3, the illustrated UI includes the content item 104 that the user 102 is currently consuming. In particular, the display 108 of the electronic device 106 displays a first portion 104(1) of the content item 104, and the first portion 104(1) is displayed by the display 108 while a second portion 104(2) is illustrated in the preview window 114. As shown in FIG. 3, the preview window 114 partially overlays the first portion 104(1) such that the first portion 104(1) remains visible outside of the preview window 114 simultaneously with the second portion 104(2) illustrated in the preview window 114. Further, as noted above, the various portions 104(1), 104(2) . . . 104(n) described herein may be from the same content item 104 or from different content items 104.

The UI illustrated in FIG. 3 includes a plurality of controls operable on the display 108. For example, a browse control 302 may be resident on the display 108 and configured to receive one or more inputs from the user 102. It is understood that, as referred to throughout this disclosure, the one or more "inputs" received by the electronic device 106 from the user 102 may include one of a non-contact-based gesture, a contact-based gesture, an audible command, or any other like action by the user 102 directed at activating, operating, or controlling the device 106. Accordingly, the browse control 302 may be configured to receive one or more such inputs directly via a touch screen or other like component of the display 108. In an example embodiment, a non-contact-based gesture may include one or more hand motions, with one or both hands, proximate the device 106 (but not contacting the device 106) and indicative of a function or operation to be performed by the device 106. For instance, an example non-contact-based gesture may include movement of the user's hand of finger, from right to left, proximate the display 108 to indicate turning a page of the content item 104. Additionally, a contact-based gesture may include one or more hand motions, with one or both hands, indicative of a function or operation to be performed by the device 106, wherein the user's hand(s) contact the device 106 during the gesture. For instance, an example contact-based gesture may include placing a finger in contact with the display 108 and moving the finger from right to left, while the finger maintains contact with the display 108. Such an example contact-based gesture may indicate turning a page of the content item 104. Further, an audible command may include one or more spoken words from the user 108 indicative of a function or operation to be performed by the device 106. For instance, an example audible command may include the user saying "turn the page," while the user 108 is within an audible range of the device 106. Such an example audible command may indicate turning a page of the content item 104.

For example, the one or more processors 202 and/or other components of the electronic device 106 may receive a first input from the user 102 indicative of a desire by the user 102 to browse one or more portions 104(2) . . . 104(n) of the content item 104, such as the second portion 104(2). It is understood that example inputs received from the user 102 may comprise various requests and/or commands associated with the content item 104, the portions 104(1), 104(2) . . . 104(n) of the content item that are either being displayed or that are to be displayed, navigation to different locations within the content item 104, searches to be performed, bookmarks, browse histories of the user 102, and/or any of the components, functions, or operations of the electronic device 106. For example, an input received from the user 102 may comprise a request to display the window 114 displaying the second portion 104(2), a request to display the second portion 104(2) on the display 108 without the window 114 (e.g., with the window 114 closed), and/or selection or manipulation of any of the controls described herein.

In example embodiments, the first input may comprise selection of the browse control 302 on the display 108, and selection of the browse control 302 may result in display of a navigation control 304 on the display 108. As noted above, the navigation control 304 may be displayed on the electronic device 106 in response to such a first input, and the preview window 114 may be displayed either concurrently with displaying the navigation control 304 or in response to receiving an additional input from the user 102 indicative of a desire to adjust the navigation control 304. For instance, once the navigation control 304 is displayed, the user 102 may press, swipe, and/or otherwise attempt to manipulate various components of the navigation control 304 in order to browse the various portions of the content item 104 in the preview window 114. Further, portions 104(2) . . . 104(n) of different content items 104 can be accessed, selected, or otherwise browsed in the preview window 114 by manipulating the browse control 302, the navigation control 304, or other like controls of the electronic device 106.

The navigation control 304 may include one or more components operable to enable the user 102 browse the content item 104 via the preview window 114 while the viewing position of the user 102 is maintained (e.g., held constant on the display 108). For example, the navigation control 304 may include a first control 306 enabling the user 102 to browse, in the preview window 114, from the second portion 104(2) illustrated therein to an additional portion 104(n) of the content item 104 with a first level of granularity. For example, the first control 306 may resemble a scrubber bar, a slider, a progress indicator, and/or other like control mechanism. In such embodiments, the first control 306 may be moved horizontally, vertically, and/or otherwise linearly by the user 102 to affect a corresponding change in the browsing position of the user in the content item 104. For example, in the embodiment of FIG. 3, moving the first control 306 to the right may move the browsing position of the user 102 from the location of the second portion 104(2) in the content item 104 (e.g., page 231 of 356) to a location of an additional portion 104(n) closer to the end of the content item 104. Conversely, moving the first control 306 to the left may move the browsing position of the user 102 from the location of the second portion 104(2) to a location of an additional portion 104(n) closer to the beginning of the content item 104. However, using the first control 306 to browse the content item 104 may be cumbersome in some applications due to the inherent lack of accuracy associated with such first controls 306.

Accordingly, in one embodiment the navigation control 304 may further include a second control 308 (identified as second controls 308a, 308b) enabling the user 102 to browse, in the preview window 114, from the second portion 104(2) to the additional portion 104(n) of the content item 104 with a second level of granularity greater than the first level of granularity associated with the first control 306. For example, the second control 308 may enable the user 102 to browse the content item 104 page by page, paragraph by paragraph, sentence by sentence, figure by figure, equation by equation, or in any other like text-based or context-based manner.

In exemplary embodiments, the UI may also include one or more identifiers assisting the user 102 in determining a current viewing position and/or browsing position. In any of the embodiments described herein, the various identifiers of the present disclosure may comprise respective indications indicative of locations of the displayed portions 104(1), 104(2) . . . 104(n) in the content item 104. For example, the display 108 may illustrate an identifier 310 indicative of a location of the first portion 104(1) in the content item 104. In particular, the identifier 310 may illustrate a page number, percentage indicator, and/or any other like indication of the viewing position of the user 102 at and/or otherwise corresponding to the location of the first portion 104(1) in the content item 104. For example in the context of the electronic book displayed on the UI of FIG. 3, such a viewing position of the user 102 may comprise a page of the electronic book determined at a current font size setting associated with the displayed first portion 104(1). In such an embodiment, the viewing position of the user 102 may correspond to the page number indicated by the identifier 310. Further, it is understood that the first portion 104(1) may be displayed on the display 108 having a first font size and the second portion 104(2) may be illustrated in the preview window 114 with a second font size different than the first font size. For example, as shown in FIG. 3, the second font size may be smaller than the first font size. In such embodiments, moving the viewing position of the user 102 from the location of the first portion 104(1) to the location of the second portion 104(2) may result in displaying the second portion 104(2) on the display 108 with and/or having the first font size.

In further embodiments, the UI may include additional identifiers indicative of a location of the second portion 104(2) in the content item 104. Again, such identifiers may comprise indications indicative of respective locations of the second portion 104(2) and/or of the additional portions 104(n) in the content item 104. For example, as shown in FIG. 3, an identifier 312a may be provided on the display 108 and a corresponding identifier 312b may be illustrated in the preview window 114. Each of the identifiers 312a, 312b may be, for example, indicative of a location of the second portion 104(2) in the content item 104. For example, the identifiers 312a, 312b may be indicative of the browsing position of the user 102 at and/or otherwise corresponding to the location of the second portion 104(2) in the content item 104. In such embodiments, the identifiers 312a, 312b may each convey different location information. For example, the identifier 312a may provide chapter, context, and/or other broad location information while the identifier 312b may provide information indicative of the page number of the second portion 104(2) illustrated in the preview window 114 and/or other more narrowly-defined location information. In further embodiments, it is understood that any additional location and/or context information associated with the various corresponding portions of the content item 104 may be provided by the identifiers 310, 312a, 312b described herein. It is also understood that in embodiments in which the display 108 displays identifiers 310, 312a, 312b and/or other indications indicative, for example, the location of respective displayed portions 104(1), 104(2) . . . 104(n) in the content item 104, such indications may include, for example, progress bars, page numbers, pie charts, chapter numbers, chapter names, appendix names, and/or other like information.

Moreover, as noted above the preview window 114 may comprise an interactive tool and/or application operable on the electronic device 106 to enable user 102 browse various portions of the content item 104. While the various components of the navigation control 304 may be configured to assist the user 102 in browsing the content item 104, in further embodiments, the preview window 114 may be configured to receive one or more inputs from the user 102 directly, thereby enabling the user 102 to browse the content item 104 via the preview window 114 without adjusting the navigation control 304. For example, the one or more processors 202, browsing module 208, and/or other components of the electronic device 106 may receive one or more inputs from the user 102 at the preview window 114. Such inputs may be indicative of a desire by the user 102 to browse one or more additional portions of the content item 104 via the preview window 114, and such additional portions of the content item 104 may be different than, for example, the second portion 104(2) currently illustrated in the preview window 114. In such embodiments, such additional inputs may comprise one or more finger swipes, hand gestures, and/or other like inputs on, for example, a touch screen of the display 108 and within a boundary of the preview window 114. In such an embodiment, the browsing position of the user 102 may be moved from the location of the second portion 104(2) in the content item 104 to the location of the additional portion of the content item 104, such that the additional portion of the content item 104 is illustrated in the preview window 114 in response to such input. Additionally, in such embodiments the first portion 104(1) may continue to be at least partially visible outside of the preview window 114 as the additional portion of the content item 114 is illustrated in the preview window 114.

It is understood that the preview window 114 may provide further functionality to the user 102 as desired. For example, the preview window 114 may also include a control 314 configured to open, close, minimize, enlarge, and/or change the shape, size, or location of the preview window 114 provided on the display 108. Additionally, the preview window 114 may include a search control provided by, for example, the preview component 216, the navigation component 218, the one or more processors 202, and/or other components of the electronic device 106. In such embodiments, the search control 316 may comprise one or more data entry fields configured to receive or select text, graphics, contextual items, and/or other inputs. Accordingly, the search control 316 may enable the user 102 to browse portions of the content item 104 sharing a common context characteristic via the preview window 114. Such a context characteristic may include, for example, one or more categories, genres, graphic types, text types, image types, equation types, table types, and/or other context-based characteristics of content included in the content item 104. Accordingly, the search control 316 may enable the user 102 to browse, navigate, and/or search for content contained within the content item 104 utilizing contextual search criteria. For example, the search control 316 may enable the user 102 to browse, via the preview window 114, all portions of the content item 104 including the identified context characteristic or search criteria. As noted above, in each of the embodiments disclosed herein, the device 106 may maintain the viewing position of the user 102 at the location of the first portion 104(1) in the content item 104 while the second, third, and/or additional portions 104(2) . . . 104(n) of the content item 104 are illustrated in the preview window 114.

The UI shown in FIG. 4 includes a preview window 114 configured to enable the user 102 to browse one or more portions 104(2) . . . 104(n) of the content item 104 that were previously bookmarked by the user 102, such as during previous consumption of the bookmarked portions by the user 102. Such bookmarked portions may be of particular importance to the user 102, and the preview window 114 may illustrate one or more of the bookmarked portions while the original viewing position of the user 102 is maintained. For example, in the hypothetical situation described above in which the user 102 is consuming an electronic book on the device 106, and the electronic book includes a map located in an Appendix, the user 102 may tag and/or otherwise bookmark the page of the Appendix including the map, and may then return to the portion (e.g., the first portion 104(1)) of the content item 104 currently being consumed. The preview window 114 of the present disclosure may enable the user 102 to browse the bookmarked map page, after returning to the portion of the content item 104 currently being consumed, while maintaining the viewing position of the user 102 at the location of the first portion 104(1).

As shown in FIG. 4, an example UI including a preview window 114 configured to assist in browsing bookmarked portions of the content item 104 may include a bookmark control 402 similar in function to the browse control 302 described above with respect to FIG. 3. For example, the bookmark control 402 may be configured to receive one or more inputs from the user 102, via the display 108, indicative of a desire to view a bookmarked portion (e.g., a second, third, and/or additional portion 104(2) . . . (n) as shown in FIG. 4) of the content item 104. Such inputs may be received, for example, by the one or more processors 202, the bookmark component 220, and/or other components of the electronic device 106 via the bookmark control 402 and/or a bookmark window 404.

For example, the bookmark window 404 may be displayed on the display 108 of the electronic device 106, and the bookmark window 404 may include one or more bookmark controls 406a, 406b, 406c, 406d (collectively, "bookmark controls 406") associated with respective bookmarked portions of the content item 104. Accordingly, the bookmark window 404 may comprise a list of the portions of the content item 104 previously bookmarked by the user 102, and each such bookmarked portion may be represented by a corresponding one of the bookmark controls 406. As shown in FIG. 4, the bookmark window 404 may overlay at least one of the first portion 104(1) and the preview window 114 such that the first portion 104(1) and the second portion 104(2) are at least partially visible outside of the bookmark window 104 simultaneously with at least one of the bookmark controls 406 illustrated in the bookmark window 404.

In one embodiment, the bookmark window 404 may illustrate a bookmark control 406b associated with the second portion 104(2) currently illustrated in the preview window 114. As shown in FIG. 4, such a bookmark control 406b may be shaded, uniquely colored, and/or may include any other applicable indicator operable to identify a relationship between the bookmark control 406b and the second portion 104(2). Additionally, one or more of the bookmark controls 406 may include identifiers 408, 410 indicative of the location of the respective bookmarked portion in the content item 104. In such embodiments, such indicators 408, 410 may provide further identification of a relationship between, for example, one of the bookmark controls 406 and the second portion 104(2).

In one embodiment, the bookmark window 404 may further illustrate a bookmark control 406a associated with the first portion 104(1) currently being displayed on the electronic device 106 at the display 108. In such an embodiment, the bookmark control 406a associated with the first portion 104(1) may include one or more controls associated with saving the bookmark control 406a in the bookmark window 404. For example, such a bookmark control 406a may include an add control 412 operable to bookmark the first portion 104, and to thereby add the bookmark control 406a to the bookmark window 404. Such a bookmark control 406a may also include one or more of the identifiers 408, 410 described above and indicative of a location of the first portion 104(1) in the content item 104.

In another embodiment, the bookmark window 404 may further illustrate one or more bookmark controls 406 associated with third and/or additional portions 104(n) of the content item 104 previously bookmarked by the user 102. In such embodiments, the bookmark window 404, the one or more processors 202, the bookmark component 220, and/or other components of the electronic device 106 may receive an additional input from the user 102 indicative of a desire to browse, for example, the third and/or additional portions 104(n) of the content item 104 previously bookmarked by the user 102. In such embodiments, such components of the device 106 may, in conjunction with the display 108, illustrate at least one of the third and/or additional portions 104(n) of the content item 104 in the preview window 114 in response to the input. It is understood that, similar to the preview window 114, the bookmark window 404 may comprise an interactive tool, component, and/or application of the electronic device 106. Accordingly, the bookmark window 404 may be configured to receive such inputs directly from the user 102 such as, for example, by tapping, swiping, and/or otherwise contacting a touch screen associated with the display 108. Further, while the at least one of the third and/or additional portions 104(n) of the content item 104 is illustrated in the preview window 114, the viewing position of the user at the location of the first portion 104(1) in the content item 104 may be maintained.

As illustrated in FIG. 4, one or more of the bookmark controls 406 illustrated in the bookmark window 404 may include various controls operable to provide functionality to the respective bookmark control 406. For example, one or more of the bookmark controls 406 may include at least one of a close control 414 operable to close the preview window 114, a delete control 416 operable to remove the respective bookmark control 406 from the bookmark window 404, the shading or unique color described above, and/or any other like indication that the second portion 104(2) of the content item 104 is currently being illustrated in the preview window 114, or one or more of the identifiers 408, 410 indicative of the location of the second portion 104(2) in the content item 104.

Additionally, to assist the user 102 in browsing the various bookmarked portions of the content item 104 with efficiency, the one or more processors 202 and/or the bookmark component 220 of the electronic device 106 may sort, tag, categorize, and/or otherwise group the various bookmarked portions of the content item 104. For example, the bookmark window 404 may illustrate a plurality of bookmark controls 406 grouped based on a common context characteristic shared by respective portions of the content item 104 corresponding to each bookmark control of the plurality of bookmark controls 406. For example, the bookmark controls 406 may be grouped based on any of the context characteristics described herein, and in an exemplary embodiment, the bookmark window 404 may further illustrate a group name and/or other like indicator identifying one or more groups of bookmark controls 406 illustrated in the bookmark window 404. Additionally, although FIG. 4 illustrates the bookmark window 404 as comprising a relatively standardized list of bookmark controls 406, in further embodiments the bookmark controls 406 may be arranged as thumbnails or in any other known configuration in the bookmark window 404 to facilitate relatively streamlined access by the user 102. In each of the embodiments described herein, one or more of the bookmark controls 406, or an additional control associated with the UI illustrated in FIG. 4, may enable the user 102 to enter and/or edit metadata associated with the bookmark controls 406 of the bookmark window 404. For example, by providing an input (e.g., by "pushing and holding" one of the bookmark controls 406 on a touchscreen of the display 108) the user 102 may cause an interactive edit control (not shown) to be displayed on the display 108. The user 102 may tag or group various bookmark controls 406, edit the text or other context-based content shown in each bookmark control 406 (e.g., associate a name or other unique identifier with the bookmark control 406), and/or otherwise modify the appearance or information associated with each bookmark control 406 using such an interactive edit control.

As shown in FIG. 5, a UI configured to enable the user 102 to browse one or more portions 104(2) . . . 104(n) of the content item 104 recommended to the user 102 by the electronic device 106 includes a preview window 114 configured to illustrate the recommended portions 104(2) . . . 104(n) of the content item 104 while the viewing position of the user 102 is maintained at a location of the first portion 104(1) in the content item 104. In such an embodiment, an example UI may include a history control 502 similar in function to the browse control 302 and bookmark control 402 described above. For example, the history control 502 may be configured to receive one or more inputs from the user 102, via the display 108, indicative of a desire to view one or more portions (e.g., a second, third, and/or additional portion 104(2) . . . (n) as shown in FIG. 5) of the content item 104 recommended by the history component 222. Such inputs may be received, for example, by the one or more processors 202, the history component 222, and/or other components of the electronic device 106 via the history control 502 and/or a touch screen or other like component associated with the display 108.

As noted above, the history component 222 may recommend such portions of the content item 104 to the user 102 based on a number of different variables including a general browsing history of the user 102, activity by the user 102 associated with browsing the content item 104 currently being consumed on the electronic device 106, and/or other like metrics. Further, such portions of the content item 104 may be recommended to the user 102 in situations in which the user 102 has a browse history characterized by nonlinearly jumping and/or otherwise browsing between various portions of the content item 104. In order to recommend such portions of the content item 104 to the user 102, the history component 222 may store and/or otherwise save, in the memory 204, a respective location in the content item 104 of each portion nonlinearly browsed by the user 102. For example, although the user 102 may not have explicitly bookmarked such portions, the history component 222 may identify such portions as being implicitly important to the user 102 based on the manner or context in which the user 102 previously browsed such portions.

The history component 222, the one or more processors 202, and/or other components of the electronic device 106 may provide an indication to the user 102 of at least one of the recommended portions and/or locations in any number of ways. For example, the UI may include a back control 504 and a forward control 506. Such controls 504, 506 may enable the user 1022 easily toggle between the various recommended portions of the content item 104. It is understood that such portions may be illustrated in the preview window 114 upon manipulation of the controls 504, 506. It is also understood that one or both of the controls 504, 506 may include text, graphics, and/or other information identifying the location of the recommended portion in the content item 104 to the user 102. The text, graphics, and/or other information of the controls 504, 506 may also assist in summarizing the content associated with each respective recommended portion.

The UI illustrated in FIG. 5 may also be operable to utilize information related to the types of content previously browsed by the user 102 in the content item 104. For example, if the user 102 previously browsed several portions of the content item 104 including contextually similar content, the history component 222 may be configured to recommend additional portions of the content item 104 to the user 102 including matching content. For example, the history component 222 may be configured to identify a common context characteristic shared by at least a subset of a plurality of portions of the content item 104 previously browsed by the user 102. In such a process, any of the context characteristics described herein may be utilized by the history component 222 in such analysis. The history component 222 may then identify at least one contextually similar portion of the content item 104 that has not been previously browsed by the user 102 and may recommend the at least one contextually similar portion to the user 102. In particular, the history component 222 may identify one or more portions of the content item 104 that are characterized by the common context characteristic, and may provide an indication to the user 102 indicative of the at least one contextually similar portion of the content item 104.

In still other embodiments, the history component 222 may be configured to predict which portion or portions of the content item 104 the user 102 may want to browse based on content included in the first portion 104(1) currently being displayed by the display 108 in addition to content included in portions of the content item 104 that the user 102 has previously nonlinearly browsed. For example, the hypothetical electronic book discussed herein may contain an Appendix including 100 maps, and the user 102 may currently be consuming a first portion 104(1) on the display 108 including content related to South Africa. Further, the user 102 may have previously nonlinearly browsed several of the maps in the Appendix illustrating various maps of the African continent. In such a situation, the history component 222 may recommend one or more portions of the electronic book comprising a subset of maps illustrative of South African cities. Such a recommendation may be different, and likely more relevant, than simply recommending all 100 maps in the Appendix based solely on the user's previous nonlinear browsing history. Accordingly, in such an example, the history component 222 may identify a common context characteristic shared by a first portion 104(1) of the content item 104 currently being displayed by the electronic device 106 and at least a subset of a plurality of additional portions 104(n). In such an embodiment, the history component 222 may also identify at least one contextually similar portion of the content item 104 not previously browsed by the user 102, wherein the at least one contextually similar portion of the content item 104 is characterized by the common context characteristic described above. The history component 222 may then provide an indication to the user 102 indicative of the at least one contextually similar portion.

Moreover, it is understood that user data associated with a plurality of additional users may be useful in providing recommendations to the user 102 of the electronic device 106. For example, the history component 222 may be able to make more relevant recommendations to the user 102 based on knowledge of typical nonlinear browsing patterns exhibited by additional users. Accordingly, the history component 222 may assist in storing user data 120 associated with browsing histories and/or browsing patterns of the user 102. Such user data 120 may be stored globally at the content item service 112. As additional user data 120 is obtained from a plurality of additional users 102, the volume of user data 120 saved at the content item service 112 may increase. This user data 120 may be periodically analyzed and/or distributed to the various electronic devices 106 connected to the content item service 112 for use in recommending portions of the content item 104 to the individual users 102. For example, a second, third, and/or additional portion 104(2) . . . (n) of the content item 104(1) may be recommended to the user 102 by the history component 222 and/or the one or more processors 202 based on previous activity by a plurality of users associated with the content item 104, as evidenced by such global user data 120.

Figure 6:
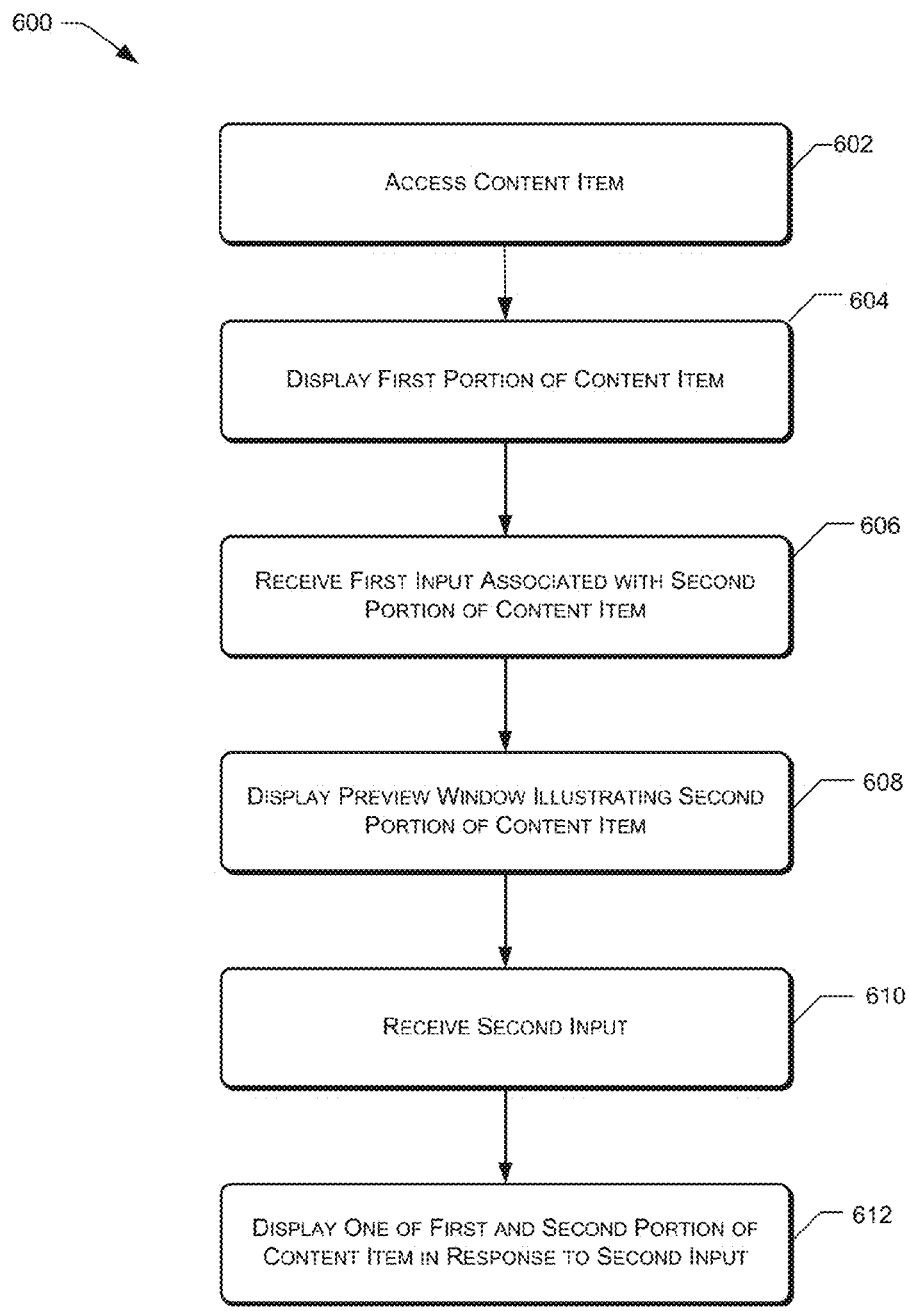
FIG. 6 is a flow diagram of an illustrative process that includes accessing a content item, displaying a first portion of the content item, receiving a first input associated with a second portion of the content item, displaying a preview window illustrating the second portion of the content item, receiving a second input, and responsively displaying one of the first and second portions of the content item.

FIG. 6 shows a flow diagram illustrative of an example processes 600 for implementing the techniques described herein. The example process 600 is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

As shown in FIG. 6, at 602 one or more processors 202 and/or other components of the device 106 may access a content item 104 that has been stored in memory 204 of the electronic device 106. In alternative embodiment, it is understood that the content item 104 may be stored in storage 118 associated with content item service 112, and in such an embodiment the content item 104 may be accessed by the electronic device 106 via the network 110.

At 604, the electronic device 106 may display a first portion 104(1) of the content item 104. For example, the electronic device 106 may display the first portion 104(1) on a display 108 of the electronic device 106 associated with the one or more processors 202 of the device 106. At 606 the device 106 and/or components thereof may receive a first input from a user 102 of the electronic device 106 associated with a second portion 104(2) of the content item 104 different than the first portion 104(1). For example, at 606 components of the device 106 may receive the first input from the user 102 indicative of a desire of the user 102 to browse the second portion 104(1) on the display 108.

At 608, the device may display a preview window 114 illustrating the second portion 104(1) of the content item 104. For example, the preview window 114 may partially overlay the first portion 104(1) such that the first portion 104(1) remains visible outside of the preview window 114 simultaneously with the second portion 104(2) illustrated in the preview window 114. Additionally, the electronic device 106 may maintain a viewing position of the user 102 at a location of the first portion 104(1) in the content item 104 while the second portion 104(2) is illustrated.

In still further embodiments, the second portion 104(2) may include one of a portion of the content item 104 previously bookmarked by the user 102, or a portion of the content item 104 recommended to the user 102 by, for example, the one or more processors 202 and/or the history component 222 based on previous activity by the user 102 associated with browsing the content item 104 on the electronic device 106.

At 610, the device may receive a second input from the user 102. In an exemplary embodiment in the second input may be indicative of a desire by the user 102 to view the second portion 104(2). Additionally, at 612, the electronic device 106 may display one of the first and second portions of the content item 104 in response to the second input received at 610.

Note that the various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

The invention claimed is:

1. A method, comprising:
   displaying a first page of an electronic book on a display of an electronic device;
   displaying a first control on the display, the first control being operable to display, on the display, a first window and a second window, the second window including a plurality of bookmark controls;
   displaying a second control on the display, wherein the second control is different from the first control, the second control being operable to display, on the display, the first window and a plurality of pages of the electronic book previously navigated to by a user of the electronic device;
   receiving a first input from the user, wherein the first input comprises a selection of at least one of the first control or the second control;
   displaying, in response to the first input, the first window on the display, wherein
      the first window includes a second page of the electronic book, the second page comprising at least one of
         a portion of the electronic book having been previously bookmarked by the user, or
         a portion of the electronic book having been previously navigated to by the user from an initial page of the electronic book, the initial page being spaced from the second page by more than one page of the electronic book,
      the first window being displayed such that a part of the first page is displayed on the display outside of the first window;
   displaying a navigation control on the display outside of the first window, the navigation control being configured to receive an input in a linear direction;
   receiving a second input from the user via the navigation control, wherein the second input comprises a contact-based gesture moving the navigation control in the linear direction;
   displaying, in response to the second input, consecutive pages of the electronic book in the first window while a position of the first window on the display remains constant;
   receiving a third input from the user, wherein the third input comprises a request to display one of the first page or the second page on the display without the first window; and
   displaying, in response to the third input, the one of the first page or the second page on the display without the first window.

2. The method of claim 1, further comprising:
   displaying the second window on the display, the second window being displayed such that the part of the first page and a part of the first window are displayed on the display outside of the second window and the part of the first window at least partly surrounds the second window, the second window including a first bookmark control of the plurality of bookmark controls and a second bookmark control of the plurality of bookmark controls,
   the first bookmark control identifying the second page displayed in the first window, and
   the second bookmark control being operable to display a third page of the electronic book in the first window, wherein the third page comprises an additional portion of the electronic book having been previously bookmarked by the user.

3. The method of claim 1, further comprising:
   displaying a third control, different from the navigation control, on the display outside of the first window; and
   displaying a fourth control on the display outside of the first widow, the fourth control being different from the third control and the navigation control, wherein
   the third control is operable to display a third page of the electronic book in the first window, the third page being located at a location in the electronic book closer to an end of the electronic book than a location of the second page, the third page having been previously navigated to by the user from the initial page by more than one page of the electronic book, and
   the fourth control is operable to display a fourth page of the electronic book in the first window, the fourth page being located at a location in the electronic book closer to a beginning of the electronic book than the location of the second page, the fourth page having been previously navigated to by the user from the initial page by more than one page of the electronic book.

4. One or more non-transitory computer-readable media storing computing instructions that, when executed by one or more processors of an electronic device, cause the electronic device to perform acts comprising:
   displaying a first page of an electronic book on a display of the electronic device;
   receiving a first input, wherein the first input comprises a request to display a window that includes a second page of the electronic book, wherein the second page is different from the first page;
   displaying the window on the display such that the first page is at least partially displayed on the display outside of the window, the second page comprising at least one of a portion of the electronic book having been previously bookmarked, or a portion of the electronic book having been previously navigated to from an initial page of the electronic book, the initial page of the electronic book being spaced from the second page by more than one page of the electronic book;

displaying a navigation control on the display outside of the window, the navigation control being configured to receive an input in a linear direction;

receiving a second input via the navigation control, wherein the second input comprises a contact-based gesture moving the navigation control in the linear direction;

displaying, based on the second input, consecutive pages of the electronic book within the window while a position of the window on the display remains constant;

receiving a third input; and doing at least one of:

closing the window and displaying the first page on the display, or closing the window and displaying the second page on the display.

5. One or more non-transitory computer-readable media as recited in claim 4, wherein the window is a first window, the acts further comprising:

displaying a second window on the display, the second window being displayed such that part of the first page and part of the first window are displayed on the display outside of the second window, the second window including one or more controls operable to control the first window.

6. One or more non-transitory computer-readable media as recited in claim 5, wherein the one or more controls include at least one control operable to control display of the second page, the acts further comprising:

displaying an identifier indicating the location of the second page in the electronic book.

7. One or more non-transitory computer-readable media as recited in claim 5, wherein the one or more controls include at least one control operable to control display of a third page of the electronic book, wherein the third page is different from the first page and the second page, and wherein the third page comprises an additional portion of the content item having been previously bookmarked, the acts further comprising:

receiving a third input via the at least one control; and displaying, in response to the third input, the third page in the first window.

8. One or more non-transitory computer-readable media as recited in claim 5, wherein each control of the one or more controls corresponds to a respective portion of the electronic book, the acts further comprising:

receiving a third input via at least one control of the one or more controls, the at least one control corresponding to a third page of the electronic book, and the third input comprising selection of the at least one control; and displaying, in response to the third input, the third page of the electronic book in the first window.

9. One or more non-transitory computer-readable media as recited in claim 5, wherein the one or more controls comprises at least one control corresponding to the first page of the electronic book, the acts further comprising:

displaying an identifier indicating the location of the first page in the electronic book.

10. One or more non-transitory computer-readable media as recited in claim 5, wherein each control of the one or more controls corresponds to a respective portion of the electronic book, and wherein each of the respective portions includes a common context characteristic, the acts further comprising:

grouping, based on the common context characteristic, the one or more controls into at least one group.

11. One or more non-transitory computer-readable media as recited in claim 10, the acts further comprising displaying an identifier in the second window, the identifier being indicative of the at least one group.

12. One or more non-transitory computer-readable media as recited in claim 4, the acts further comprising:

displaying a plurality of additional pages of the electronic book, wherein each page of the plurality of additional pages is spaced from a respective initial page of the electronic book by more than one page of the electronic book;

saving, in a memory of the electronic device, a respective location in the electronic book of each page of the plurality of additional pages; and displaying a first identifier indicative of at least one of the respective locations.

13. One or more non-transitory computer-readable media as recited in claim 12, the acts further comprising:

identifying a common context characteristic included in at least a subset of the plurality of additional pages;

identifying at least one further page of the electronic book, the at least one further page of the electronic book including the common context characteristic, and the at least one further page of the electronic book being different from the pages of the plurality of additional pages; and displaying a second identifier indicative of the at least one further page of the electronic book.

14. One or more non-transitory computer-readable media as recited in claim 12, the acts further comprising:

identifying a common context characteristic included in the first page and at least a subset of the plurality of additional pages;

identifying at least one further page of the electronic book, the at least one further page of the electronic book including the common context characteristic, and the at least one further page of the electronic book being different from the first page and the pages of the plurality of additional pages; and displaying a second identifier indicative of the at least one further page of the electronic book.

15. An electronic device comprising:

one or more processors;

memory;

an electronic book stored in the memory;

a display configured to display pages of the electronic book;

a module stored in the memory and executable on the one or more processors to:

display a first page of the electronic book on the display;

receive a first input, wherein the first input comprises a request to display a window that includes a second page of the electronic book, wherein the second page is different from the first page;

display the window on the display such that the first page is at least partially displayed on the display outside of the window, the second page comprising at least one of a portion of the content item having been previously bookmarked, or a portion of the content item having been previously navigated to from an initial page of the electronic book, the initial page of the electronic book being spaced from the second page by more than one page of the electronic book;

display a navigation control on the display outside of the window, the navigation control being configured to receive an input in a linear direction;

receive a second input via the navigation control, wherein the second input comprises a contact-based gesture moving the navigation control in the linear direction;

display, based on the second input, consecutive pages of the electronic book within the window while a position of the window on the display remains constant;

receive a third input comprising a request to display at least one of the first page or the second page on the display; and doing at least one of:
    close the window and display the first page on the display, or
    close the window and display the second page on the display.

16. The electronic device of claim 15, wherein the module comprises a bookmark component, the bookmark component being executable on the one or more processors to:

display a second window on the display, the second window being displayed such that part of the first page and part of the first window are displayed on the display outside of the second window, the second window including one or more controls operable to control the first window.

17. The electronic device of claim 16, wherein each control of the one or more controls corresponds to a respective portion of the content item electronic book, the bookmark component being further executable on the one or more processors to:

receive a fourth input via at least one control of the one or more controls, the at least one control corresponding to a third page of the electronic book having been previously bookmarked; and display, in response to the fourth input, the third page of the electronic book in the first window.

18. The electronic device of claim 15, wherein the module comprises a history component, the history component being executable on the one or more processors to:

display, on the display, a plurality of additional pages of the electronic book, wherein each page of the plurality of additional pages is spaced from a respective initial page of the electronic book by more than one page of the electronic book; and save, in the memory of the electronic device, a respective location in the electronic book of each page of the plurality of additional pages.

19. The electronic device of claim 18, wherein the module is further executable on the one or more processors to:

display, on the display, one or more controls, wherein the one or more controls are operable to control display of the plurality of additional pages.

20. The method of claim 1,
wherein the navigation control comprises a first navigation control, the method further comprising
displaying a second navigation control, on the display outside of the first window, when the first navigation control is displayed, the second navigation control being different from the first navigation control and operable to display consecutive pages of the electronic book in the first window.

21. The method of claim 1, further comprising displaying the navigation control at least partly in response to receiving the first input.

22. The method of claim 1, wherein the navigation control is displayed as a slider, the method further comprising
receiving the second input via the slider.

23. The method of claim 1, further comprising:
displaying a first identifier outside of the first window, the first identifier indicting a location of the first page in the electronic book; and
displaying a second identifier outside of the first window, the second identifier indicting a location of the second page in the electronic book.

\* \* \* \* \*